(12) United States Patent
Heinz et al.

(10) Patent No.: US 7,765,230 B2
(45) Date of Patent: Jul. 27, 2010

(54) METHOD AND SYSTEM FOR MANAGING DATA

(75) Inventors: Kathy K. Heinz, Maple Valley, WA (US); John R. Allen, Bainbridge Island, WA (US); Swathi Chilukuri, Westerville, OH (US); Rohinton N. Mistry, Issaquah, WA (US); Scott D. Taylor, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 299 days.

(21) Appl. No.: 11/291,972

(22) Filed: Dec. 1, 2005

(65) Prior Publication Data

US 2007/0130146 A1      Jun. 7, 2007

(51) Int. Cl.
*G06F 7/00* (2006.01)
*G06F 17/30* (2006.01)

(52) U.S. Cl. ............... 707/781; 707/782; 707/783; 709/203

(58) Field of Classification Search ............ None
See application file for complete search history.

(56) References Cited

U.S. PATENT DOCUMENTS

| | | | | |
|---|---|---|---|---|
| 5,175,822 | A * | 12/1992 | Dixon et al. | 710/9 |
| 5,819,084 | A * | 10/1998 | Shapiro et al. | 707/10 |
| 6,332,127 | B1 * | 12/2001 | Bandera et al. | 705/14 |
| 6,714,952 | B2 * | 3/2004 | Dunham et al. | 707/204 |
| 7,492,542 | B2 * | 2/2009 | van Zyl | 360/69 |
| 2002/0073173 | A1 * | 6/2002 | Selvakumar | 709/219 |
| 2003/0110237 | A1 * | 6/2003 | Kitamura et al. | 709/219 |
| 2004/0024838 | A1 * | 2/2004 | Cochran | 709/214 |
| 2004/0034550 | A1 * | 2/2004 | Menschik et al. | 705/3 |
| 2004/0172302 | A1 * | 9/2004 | Martucci et al. | 705/2 |
| 2005/0065817 | A1 * | 3/2005 | Mihai et al. | 705/2 |
| 2005/0138019 | A1 * | 6/2005 | Betts et al. | 707/3 |
| 2006/0161460 | A1 * | 7/2006 | Smitherman et al. | 705/3 |
| 2006/0212481 | A1 * | 9/2006 | Stacey et al. | 707/104.1 |

* cited by examiner

*Primary Examiner*—Khanh B Pham
*Assistant Examiner*—Azam Cheema
(74) *Attorney, Agent, or Firm*—Yee & Associates, P.C.; Baldwin D. Quan

(57) ABSTRACT

Method and system for validating data residing on different servers is provided. The method includes providing a first user interface from a first location, said first user interface providing access to data residing on a server in the first location, a substantial copy of said data made available on a server in a second location; re-directing a user to a second user interface from the second location upon an event in the first location, said second user interface providing access to the validated data on the server in the second location; and initiating a validation mode for validating the substantial copy of the data on the server at the second location upon the event in the first location. A Validator module identifies one or more data added or updated to a metadata on the server at the second location based on said validation parameters; and verifies existence of said identified data in one or more data files on the server at the second location based on said validation parameters.

18 Claims, 6 Drawing Sheets

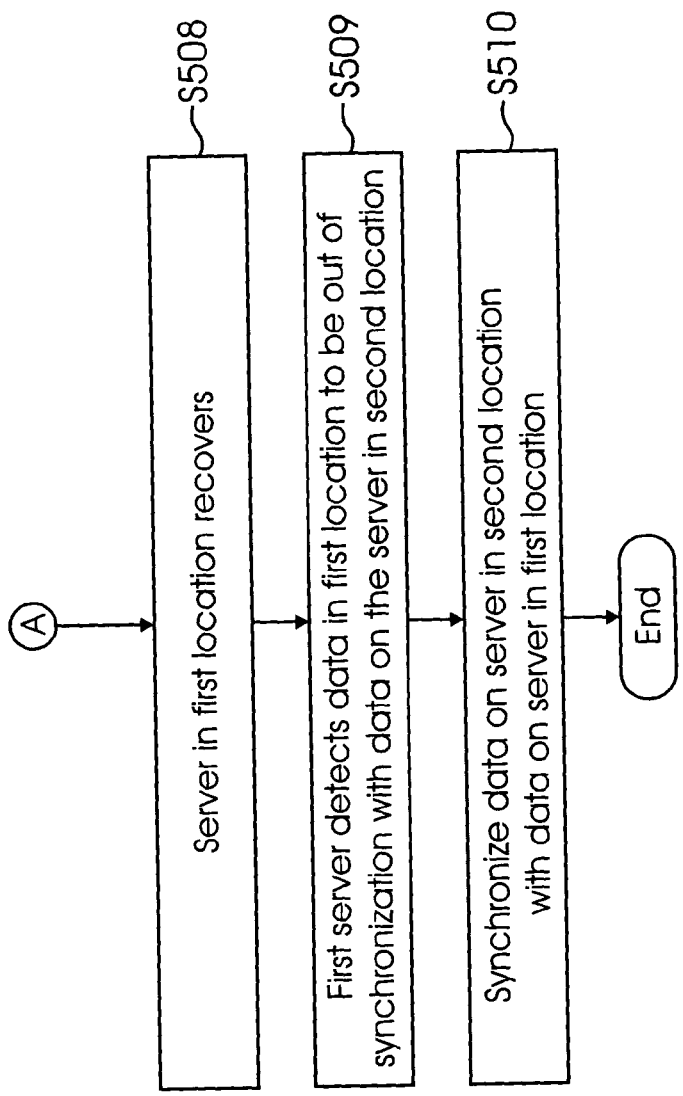

METHOD AND SYSTEM FOR MANAGING DATA

CROSS REFERENCE TO RELATED APPLICATIONS

None

BACKGROUND

1. Field of Invention

This invention relates generally to computing systems, and in particular, to a method of managing access to data stored in plural locations and managed by plural servers.

2. Background of the Invention

In the world of E-commerce, computer networks and Internet, safety, security and availability of data is important for a business to survive and succeed. Companies use various tools to maintain data integrity. Data integrity refers to the quality, consistency and accuracy of the data provided to a user. Poor data integrity means data is corrupt, garbled, incomplete, unreliable, inaccurate or out of date. Data integrity helps improve the accuracy, efficiency and productivity of users.

Data integrity, in a computing environment, can be compromised through human errors, errors during transmission, software bugs, hardware malfunctions such as system crashes or disk crashes or by natural disasters. Most companies back up data so that if the storage system crashes, data is not completely lost.

Data is typically stored in a primary storage location that is managed by a primary server. Data is typically stored as file data and metadata. Data is backed up at a secondary storage location and managed by a secondary server.

It is noteworthy that the term server, primary server and secondary server as used herein include the storage system that actually stores the data. These terms also include virtual storage systems, where data is stored in multiple locations but to the server it appears to be located at a single location.

Backups are done real-time so that the users are provided with the most recent and accurate data at any time on the secondary server in the event the primary server crashes or becomes unavailable. Even with real time data backup, there is some inherent latency. If the primary server crashes or becomes unavailable during the backup period, the data available on the secondary or backup server can easily get out of synchronization due to the latency and the users are left with inaccurate data.

In view of the foregoing, there is a need for a method and system to automatically check and correct any disconnects between related data sources residing on one or more servers as and when it occurs with little or no impact to the users. There is also a need to synchronize data residing on a primary server(s) and backup server(s) periodically to minimize loss of data and enable users to have the most updated data for processing.

SUMMARY OF THE INVENTION

In one aspect of the present invention, a method for validating data residing on different servers is provided. The method includes providing a first user interface from a first location, said first user interface providing access to data residing on a server in the first location, a substantial copy of said data made available on a server in a second location; re-directing a user to a second user interface from the second location upon an event in the first location, said second user interface providing access to the validated data on the server in the second location; and initiating a validation mode for validating the substantial copy of the data on the server at the second location upon the event in the first location;

In another aspect of the present invention, a system for validating data residing on different servers is provided. The system includes a first server to store and provide data in a first location, a second server in a second location having a substantial copy of data from the first location, the second server connected to the first server using a network connection, and a Validator module accessible by the second server to validate the data residing in the second location.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. The illustrated embodiment is intended to illustrate, but not to limit the invention. The drawings include the following.

DETAILED DESCRIPTION OF THE PREFERRED EMBODIMENTS

In one aspect of the present invention, a system and process is provided with a first user interface to access data stored on a first server in first location and backed up to a second server in a second location, re-directing access to data using a second user interface operating out of the second location upon a triggering event on the first server, the second user interface providing access to the data copied from the first server in first location to the second server in the second location, and initiating a validation (or Failsafe) mode for validating data on the second server.

To facilitate an understanding of the preferred embodiment, the general architecture and operation of a computing system will be described first. The specific process under the preferred embodiment will then be described with reference to the general architecture.

Figure 1:
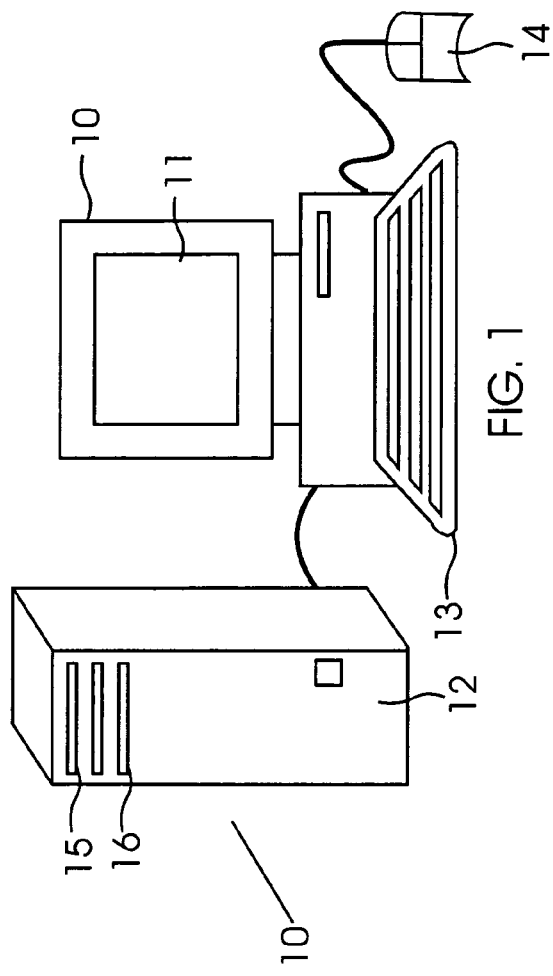
FIG. 1 shows a block diagram of a computing system for executing process steps, according to one aspect of the present invention.

Computing System:

FIG. 1 is a block diagram of a computing system for executing computer executable process steps according to one aspect of the present invention. FIG. 1 includes a host computer 10 and a monitor 11. Monitor 11 may be a CRT type, a LCD type, or any other type of color or monochrome display.

Also provided with computer 10 are a keyboard 13 for entering data and user commands, and a pointing device (for example, a mouse) 14 for processing objects displayed on monitor 11.

Computer 10 includes a computer-readable memory storage device 15 for storing readable data. Besides other programs, storage device 15 can store application programs including web browsers and computer executable code, according to the present invention.

According to one aspect of the present invention, computer 10 can also access computer-readable floppy disks storing data files, application program files, and computer executable process steps embodying the present invention or the like via a floppy disk drive 16. A CD-ROM, or CD R/W (read/write) interface (not shown) may also be provided with computer 10 to access application program files, and data files stored on a CD-ROM.

A modem, an integrated services digital network (ISDN) connection, or the like also provide computer 10 with an Internet connection 12 to the World Wide Web (WWW) or to the intranet—the network of computers within a company or entity within the company. The Internet connection 12 allows computer 10 to download data files, application program files and computer-executable process steps embodying the present invention.

It is noteworthy that the present invention is not limited to the FIG. 1 architecture. For example, notebook or laptop computers, set-top boxes or any other system capable of connecting to the internet or intranet and running computer-executable process steps, as described below, may be used to implement the various aspects of the present invention.

Figure 2:
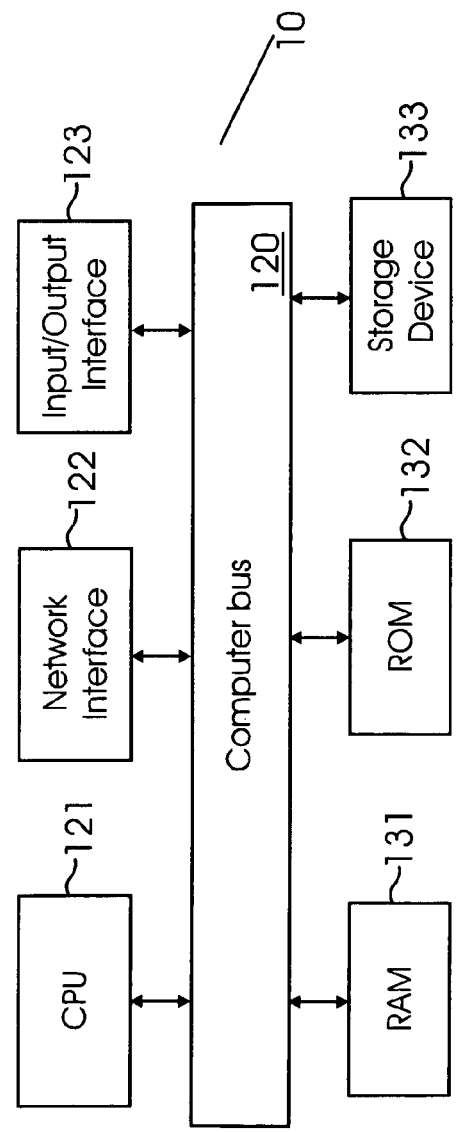
FIG. 2 shows the internal architecture of the computing system of FIG. 1.

FIG. 2 shows a top-level block diagram showing the internal functional architecture of a computing system 10 that may be used to execute the computer-executable process steps, according to one aspect of the present invention. As shown in FIG. 2, computing system 10 includes a central processing unit (CPU) 121 for executing computer-executable process steps and interfaces with a computer bus 120.

Also shown in FIG. 2 are an input/output interface 123 that operatively connects output display device such as monitors, input devices such as keyboards and pointing device such as a mouse (14).

A storage device 133 also interfaces to the computing device 100 through the computer bus 120. Storage device 133 may be disks, tapes, drums, integrated circuits, or the like, operative to hold data by any means, including magnetically, electrically, optically, and the like. Storage device 133 stores operating system program files, application program files, computer-executable process steps, web-browsers and other files. Some of these files are stored on storage device 133 using an installation program. For example, CPU 121 executes computer-executable process steps of an installation program so that CPU 121 can properly execute the application program.

Random access memory ("RAM") 131 also interfaces to computer bus 120 to provide CPU 121 with access to memory storage. When executing stored computer-executable process steps from storage device 133, CPU 121 stores and executes the process steps out of RAM 131.

Read only memory ("ROM") 132 is provided to store invariant instruction sequences such as start-up instruction sequences or basic input/output operating system (BIOS) sequences.

The computing system 10 can be connected to other computing systems through the network interface 122 using computer bus 120 and network connection (not shown). The network interface 122 may be adapted to one or more of a wide variety of networks, including local area networks, storage area networks, wide area networks, the Internet, and the like. In one aspect of the invention, validation software (Validator or Failsafe Module used interchangeably throughout this specification) may be supplied on a CD-ROM or a floppy disk (depicted as storage device 133), or alternatively could be read from the network via a network interface 122 connected to the computing system 10 at the second location. In yet another aspect of the invention, the computing system 10 at the second location can load the Validator from other computer readable media such as magnetic tape, a ROM, integrated circuit, or a magneto-optical disk. Alternatively, the Validator is installed onto the storage device 133 of the computing system 10 at the second location using an installation program and is executed using the CPU 121.

The Validator module is deployed on a server (41, FIG. 3A) and is accessible by a system's administrator using a network monitoring/maintenance utility (not shown).

In yet another aspect, the Validator may be implemented by using an Application Specific Integrated Circuit that interfaces with computing system 10.

It is noteworthy that the computing system 10 described above may have more or fewer components depending upon whether it is being used as a server or a user workstation. The adaptive aspects of the present invention do not depend on the architecture of the computing system.

Computer-executable process steps, according to one aspect of the present invention may be performed using the Internet. The following provides a brief description of the Internet.

The Internet connects plural computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language (XML) as published by W3C Consortium, Version 1, Second Edition, October 2000, ©W3C may also be used. The collection of all such publicly available computer files is known as the World Wide Web (WWW).

A typical Internet user uses a client program called a "Web Browser" to connect to the Internet. A user can connect to the Internet via a proprietary network, such as America Online or CompuServe, or via an Internet Service Provider, e.g., Earthlink. The web browser may run on any computer connected to the Internet. Currently, various browsers are available of which two prominent browsers are Netscape Navigator and Microsoft Internet Explorer.

The Web Browser receives and sends requests to a web server and acquires information from the WWW. A web server is a program that, upon receipt of a request, sends the requested data to the requesting user.

Uniform Resource Locator ("URL"), a standard naming convention has been adopted to represent hypermedia links and links to network services. Most files or services can be represented with a URL. URLs also enable two programs on two separate computers to communicate with each other through simple object access protocol ("SOAP"), extensible markup language ("XML"), and other protocols published by the W3C consortium, incorporated herein by reference in its entirety.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP). It is noteworthy that the invention is not limited to standard WWW or W3C protocols for server access and information exchange.

Figure 3A:
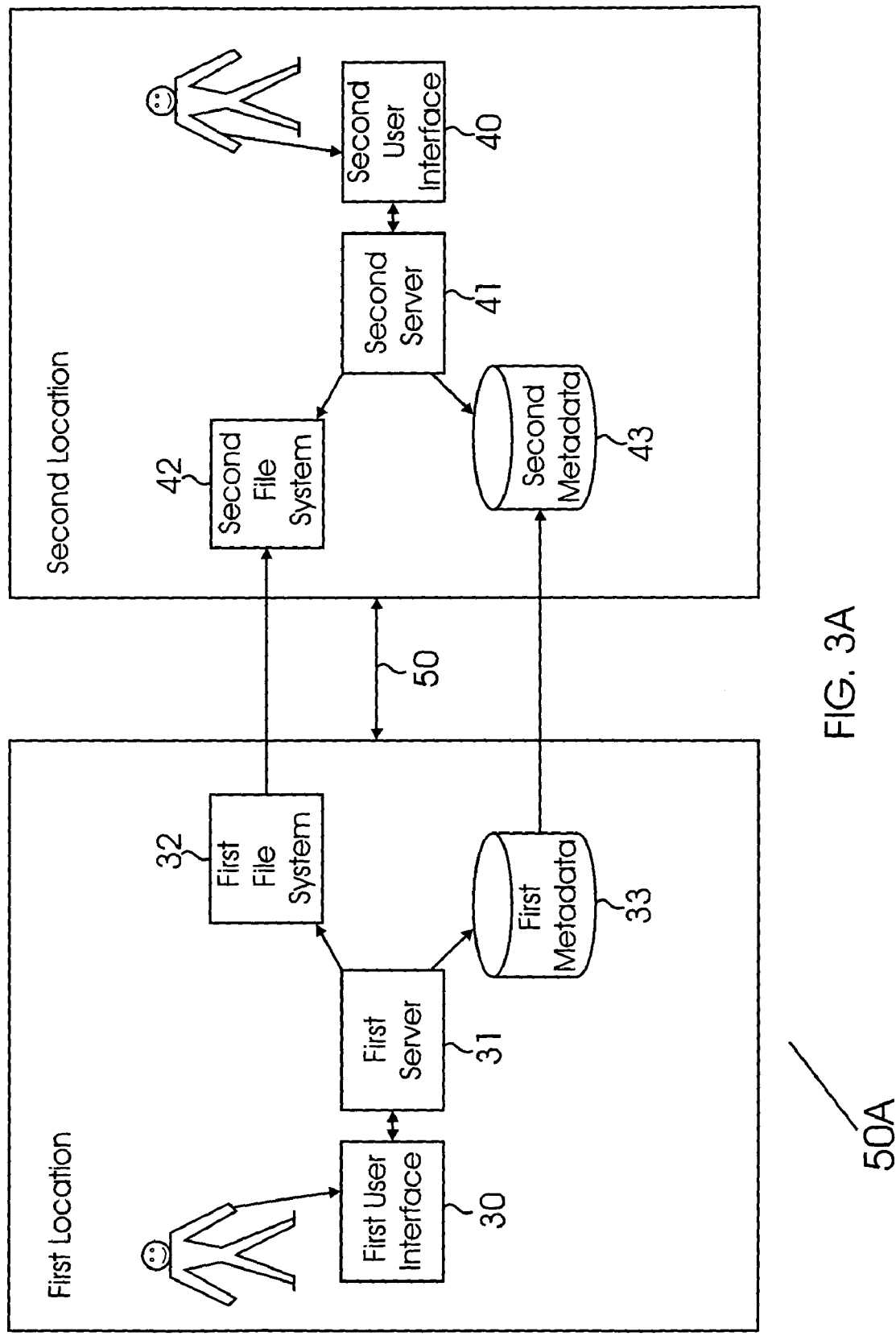
FIG. 3a shows process flow for real-time data backup from a first server in a first location to second server in a second location, according to one aspect of the present invention.

Validation System:

The validation (or failsafe) system is now explained in greater detail. FIG. 3a shows the overall system 50A for real-time data backup from a server at the first location to a backup system on a server at a second location. A user is provided with a first user interface 30 to access data residing on a server (first server 31) in a first location. The first server 31 is a computing system 10 designed to hold and/or manage data resources at the first location.

Data is stored as file data or file system data 32 with associated first metadata 33. The first file system 32 includes one or more data files in the first location. First metadata 33 captures and stores plurality of attributes related to the data files in the first file system 32 in the first location. First file system 32 could include security files, system configuration files, system parameter files, application data files, application security files and the like, to name a few. Metadata could include attributes pertaining to the system files and application data files. Some of the attributes can include one or more of filename, file type, file create date, file created by, file size, last update date, last update time, last updated by, last access date, last access time, last accessed by, and format.

The first user interface 30 could be a menu of an application or any interactive media interface running on a computing system 10 that is connected to the first server using a network connection 50. The first location could be a physical location where the first server 31 is physically located. For example: First location could be Boston, Mass. or Seattle, Wash. or Dallas, Tex. In another aspect, the first location refers to a first storage system that operates as a primary location for data storage.

The first server 31 and the first user interface 30 in the first location could be part of a client/server network wherein the first user interface 30 could be a client running user applications and the first server 31 is the server managing server resources such as data, devices such as disk drives and printers, network traffic and processing power. The data in the first location could be stored on the first server 31 or can be stored on one or more computing system 10 and managed by the first server 31 within the client/server network of the first location.

A single storage device (15 or 133) on the first server 31 can be partitioned to house both the first file system 32 and the first metadata 33 in the first location. Alternatively, a plurality of storage devices 15 distributed within the first server 31 or plurality of storage devices 15 distributed within a plurality of computing systems 10 within the client/server network and accessible by the first server 31 could store the first file system 32 and first metadata 33 in the first location.

The users in the first location enter or modify data using the first user interface 30 The data entered or modified by the users gets updated to appropriate system and data files in the first file system 32 and the corresponding first metadata 33.

The client/server network in the first location is connected to a second client/server network in a second location through a network connection 50. The second client/server network comprises one or more client computing systems 10 connected by network connection 50 to one or more server computing systems 10. A second server 41, in the second client/server network, is a server computing system 10 designed to hold and/or manage data resources at the second location.

A second user interface 40 could be a menu of an application or any interactive media interface running on a client computing system 10 that is connected to the second server 41 using a network connection 50. The second location is a physical location where the second server 41 is physically located and/or a separate storage system that operates as a back-up system.

When the user adds or modifies data on the first server 31 using the first user interface 30, the first file system 32 in the first location gets updated and, in turn, updates a second file system 42 in the second location through the network connection 50. Likewise, first metadata 33 in the first location is updated and, in turn, updates the corresponding second metadata 43 in the second location through the network connection 50. The data from the first file system 32 and first metadata 33 in first location to corresponding files in second file system 42 and second metadata 43 in second location are updated real-time.

The second file system 42 and the corresponding second metadata 43 in the second location may be stored in a single storage device 15 partitioned to hold both the second file system 42 and the corresponding second metadata 43 on the second server 41. The second file system 42 and the corresponding second metadata 43, alternatively, can be stored in a plurality of storage devices 15 within the second server 41 or within a plurality of computing systems 10 within the second client/server network and accessible by the second server 41 in the second location. The users access the data copied to the second location through a second user interface 40. The second user interface 40 could be a client computing system 10 running an application and connected to the second server 41 within the second client/server network using network connection 50.

Some latency exists in the update of data from the first file system 32 and first metadata 33 to corresponding files in second file system 42 and second metadata 43. Data that is available from the first location may not be available from the second location when events such as a server crashing, loss of connection between the databases or between the file servers, or any loss of network connection during the latency period. For example, file system data 32 may have been updated at second file system 42, but the first metadata 33 may not have been updated at second metadata 43. Validation software is run at the second location to correct the inconsistency and to provide the users with valid data.

Figure 3B:
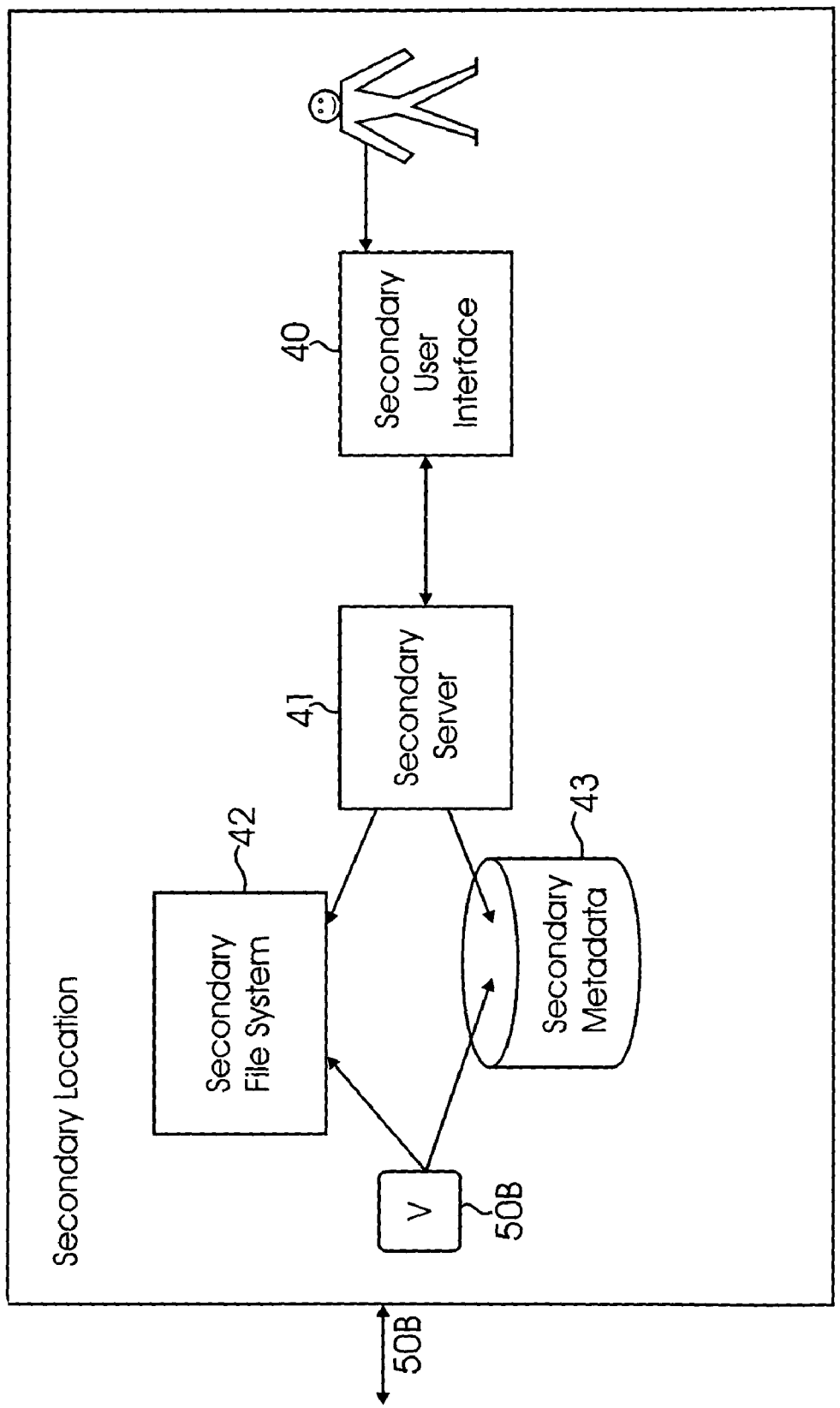
FIG. 3b shows process flow for a Validator module running on a second server in a second location, according to one aspect of the present invention.

FIG. 3b shows an example of a system running validation software module 50B (Validator) at the second location, in one embodiment of the present invention. Validator 50B can be supplied as a CD-ROM or a floppy disk, or in a computer readable media such as magnetic tape, a ROM or integrated circuit, a magneto-optical disk or alternatively is accessed via the Internet and initiated by the second server 41 through a network connection 50 using network interface 122 at the second location.

Validation 50B is deployed at server 41 regardless of how server 41 obtains access to the actual code.

A plurality of validation parameters can be supplied to Validator 50B during each run, for example, the start time, end time, modification authorization—whether there is authorization to modify file system data or metadata in the second location or to just report, and/or action to be taken (delete, report or delete & report). Validator 50B could also be run on specific set of applications or on all applications. The validation parameters will identify the type of operation the Validator has to perform during each run.

Validator 50B can be triggered if there is a failure at the first location that prevents the user from accessing data stored at the first location. The end date and end time are optional parameters that can be passed during each run. If not provided, the end date and end time could be the current system date and time. In one aspect of the present invention, a start date and time is provided by the System Administrator (not shown) as to when Validator module should start.

When Validator 50B is triggered by an event, it accesses the second file system 42 and second metadata 43 in the second location, examines the data in the second file system 42 against the corresponding second metadata 43 for any data disconnects, validates the second metadata 43 against the files in second file system 42 and reports any disconnect between the second file system 42 data and corresponding second metadata 43. In one aspect, a report itemizing the data disconnect is forwarded to the user after each Validator 50B run.

Optionally, Validator 50B can modify the second metadata 43 references so that the metadata (41) is synchronized with data in the second file system 42 when there are data disconnects in the second location. The option for modifying the data by the Validator in the second location can be set by a user or can be set during data definition stage or when Validator 50B is initiated.

In one aspect of the present invention, data from the second file system 42 is verified and validated against the corresponding second metadata 43. Any data in the second file system 42 without corresponding second metadata 43 (or vice-versa) is deleted.

Upon validation of data in the second location, Validator 50B provides the data to the user in a read-only mode so that users have access to the validated data at the second location.

Figure 4:
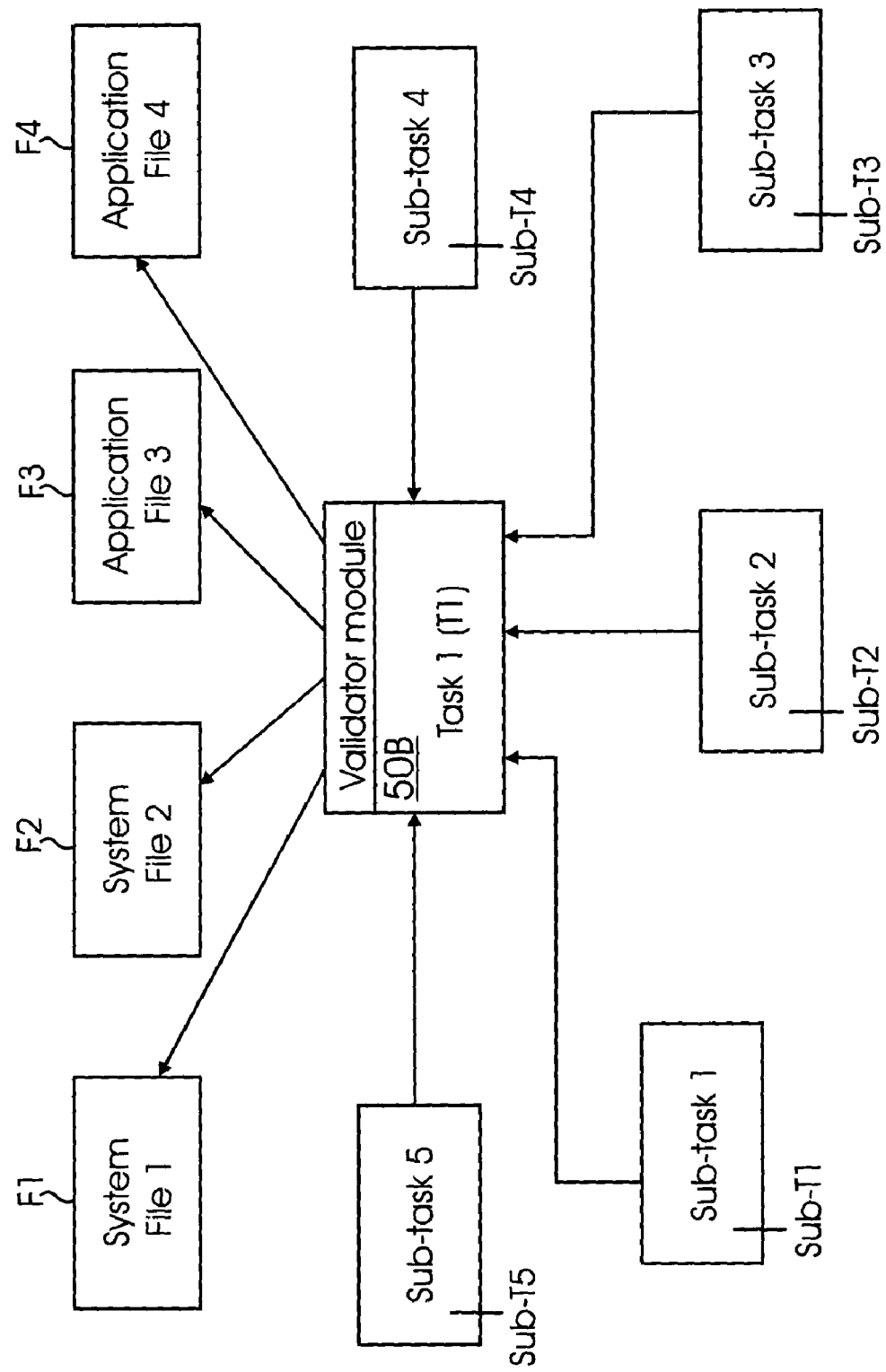
FIG. 4 shows an example of a class diagram for validating data, according to one aspect of the present invention.

FIG. 4 shows an example of a class diagram used by Validator 50B. Validator 50B receives input from various data types (shown as F1, F2, F3 and F4). System file 1 and 2 may pertain to files related to the system such as system security file, system data file, to name a few. The application data files (F3 and F4) could relate to data on specific applications.

If Validator 50B is used in an airline/manufacturing industry then F1 could be related to job cards, F2 could be legacy documents, F3 could be repair records and F4 could be system files.

Validator 50B performs various tasks under Task 1 and they are described below with respect to the process flow diagram of FIG. 5.

Figure 5A:
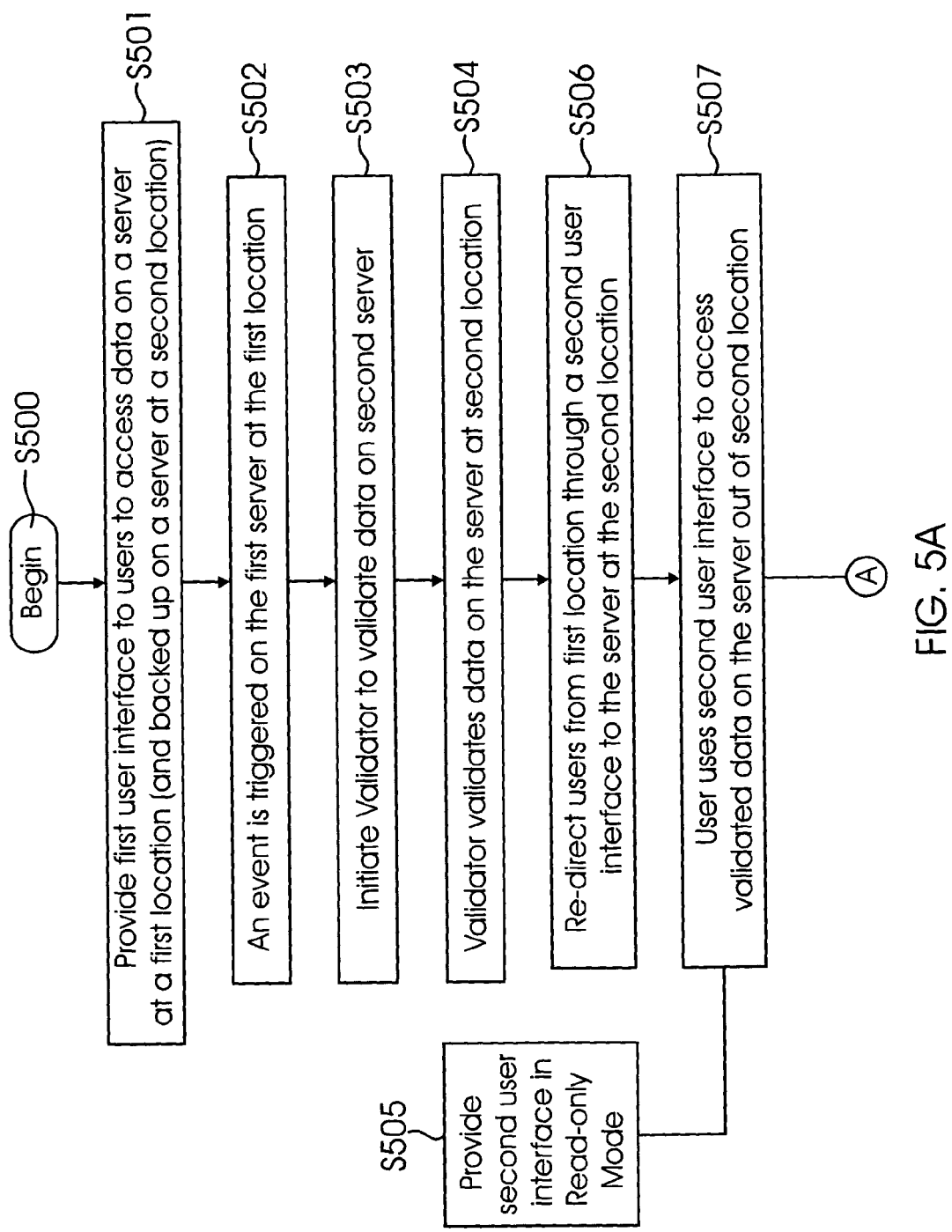
FIG. 5 shows a flowchart for validating data on the second server, according to one aspect of the present invention.

Process Flow:

FIG. 5 shows a flowchart for validating data using Validator 50B in the second location, according to one embodiment of the present invention.

The process begins in step S500 and in step S501, the user is provided with a first user interface 30 to access data in a first location. The first location could be a physical location where data used in an application is housed and updated. For example, one of the files in the first file system 32 could be an online, airplane maintenance manual and records are updated when maintenance to various parts of the airplane is performed.

In step S502, the first server 31 in the first location fails or becomes unavailable (failover event). The first server 31 could fail or become unavailable due to problems in hardware, software, natural or man-made disasters. When the fail-over occurs at the first server 31, the data in the first location becomes unavailable till the first server 31 recovers from the fail-over. The users may need access to valid data during the period the first server 31 is unavailable.

In step S503, Validator S0B is initialized to validate the data residing in the second location. This may occur automatically or is initiated by a system's administrator. In one aspect, Validator S0B residing on the second server 41 in the second location or accessed from the Internet by the second server 41 detects the unavailability of first server 31 due to fail-over and gets initiated. A system administrator may initiate validator module after a fail over is detected or it may be initiated automatically. Step S503 may include receiving one or more validation parameters. The validation parameters could be received from the first location when first server 31 fails or could be set by the system automatically using system parameters when the first server 31 failed.

In step S504, Validator 50B validates data stored in the second location. In one aspect, this is performed by comparing data in second file system 42 with metadata 43 (or vice-versa).

The task of data validation, as shown in S504, may include a plurality of subtasks. Referring back to FIG. 4, task T1 of running Validator 50B can include a plurality of sub-tasks. For example: Sub-task 1 (Sub-T1) could verify the structure of the files in the second file system 42 to ensure they are not corrupted or out of synchronization; sub-task 2 (Sub-T2) could verify the data integrity of Systems, Library, Authorization files; sub-task 3 (Sub-T3) could verify that each task runs in the proper order and accesses and closes the files appropriately; sub-task 4 (Sub-T4) could run a SQL query to verify the records within the file system 42 are validated; and sub-task 5 (Sub-T5) could be used to close Validator 50B, related records, files and metadata methodically in case of an exception.

Validator 50B would use the validation parameters to compare the data between the second metadata 43 and the second file system 42 data in the second location. Validator 50B uses the parameters such as start date and time, end date and time, and checks the second metadata 43 for any data references that were modified, added or deleted during the specified time. It also examines the second file system 42 data to verify if the data identified in the second metadata 43 have related record information or file information in the second file system 42.

In step S505, the second user interface 40 is set to a read-only mode. It is noteworthy that a separate user interface can be used to change the mode to a read-only mode. The task of providing the data in a read-only mode would further include write locking the second file system 42 and second metadata 43 in the second location to prevent any updates. It is noteworthy that steps S505 and S504 may occur simultaneously.

Upon successful validation of data in the second location (in step S504), in step S506, the users is re-directed to the second user interface 40. This could entail shutting down access to the first user interface 30 in the first location and providing second user interface 40 to access the data on the second server 41 from the second location.

The users use the second user interface 40 to access the validated data in the second location in a read-only mode, as shown in step S507. This would enable the users to continue working with the data in the second location while the first server is still down.

Once the first server 31 recovers from the fail-over and is up and running (as shown in S508), the system detects an incomplete task that was supposed to copy the data from the first server 31 over to the second server 41 in the second location, as shown in S509. The system automatically re-starts the incomplete task and runs it to completion, as shown in S510. This task once completed would ensure the synchronization of the data within the second location and also between the second location and the first location. While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for providing access to data residing on different servers comprising:
   providing a first user interface from a first location, said first user interface providing access to a first data in a first file system and a first metadata associated with the first data in the first file system, the first data and the first metadata residing on a first server in the first location;
   providing a second server in a second location, said second server including a second data in a second file system and a second metadata associated with said second data in the second file system, said second data being a substantial copy of said first data;
   responsive to a change in the first data or the first metadata, updating the second file system with the change;
   responsive to an event occurring in the first location such that the first server is unavailable, re-directing a user from the first user interface from the first location to a second user interface from the second location, said second user interface providing access to the second data, wherein the second user interface operates in a read-only mode to prevent any user updates of the second data or the second metadata, and wherein the re-directing includes preventing user access to the first user interface;
   supplying a plurality of validation parameters to a validator module;
   validating the second data using the validator module upon the event in the first location, wherein the step of validating the second data comprises accessing the second data and the second metadata in the second file system, determining whether the second file system contains both the second data and the second metadata, and responsive to a determination that the second file system does not contain both the second data and the second metadata, reporting the determination;
   identifying a data file added or updated to the second server from the first server based on the validation parameters to form an identified data file; and
   verifying the existence of said identified data file on the second server based on the validation parameters.

2. The method of claim 1, wherein the event in the first location is a failure of said server located in said first location.

3. The method of claim 1, wherein the second metadata includes one or more attributes of data files in said second file system, said attributes including one or more of a filename, a file type, a file create date, a file created by, a file size, a last update date, a last update time, a last updated by, a last access date, a last access time, a last accessed by, and a format.

4. The method of claim 1, further including the validator module modifying the second metadata to remove references to the identified data file responsive to the identified data file not existing on the second server.

5. The method of claim 1, wherein said validation parameters include one or more of a start date for validating the second data, a start time for validating the second data, an end date for validating the second data, an end time for validating the second data, wherein the data file is identified when the data file was added or updated to the second server from the first server between the start time on the start date and the end time on the end date.

6. The method of claim 1, further comprising the Validator module modifying the second metadata when the second file system contains the second metadata and does not contain the second data so that the second metadata is synchronized with the second data.

7. The method of claim 1, further comprising the Validator module deleting any portion of the second data when the second file system contains the second data and does not contain the second metadata.

8. The method of claim 1, further comprising the Validator module deleting any portion of the second metadata when the second file system contains the second metadata and does not contain the second data.

9. The method of claim 1, further comprising detecting an incomplete task that was supposed to have copied the first data to the second file system and restarting the incomplete task and running it to completion once the first file system recovers from the event.

10. A system for providing access to data residing on different servers, the system comprising:
    a first server configured to store and provide access to a first data in a first file system and a first metadata associated with the first data in the first file system, the first data and the first metadata residing in a first location;
    a first user interface configured to access said first data;
    a second server in a second location, said second server being configured to store and provide access to a second data in a second file system and a second metadata associated with said second data in the second file system, said second data being a substantial copy of said first data, said second server being connected to the first server using a network connection, and said second file system being updated with a change responsive to the change occurring in the first data or the first metadata;
    a second user interface configured to access said second data responsive to an event occurring in the first location such that the first server is unavailable, said second user interface being connected to the second server, wherein the second user interface operates in a read-only mode to prevent any user updates of the second data or the second metadata, and wherein after the event in the first location access to the first user interface is prevented; and
    a Validator module configured to receive a plurality of validation parameters and validate said second data by accessing the second data and the second metadata in the second file system, determine whether the second file system contains both the second data and the second metadata, and reporting the determination of the Validator module being accessible by the second server; and
    wherein the Validator module is further configured to identify a data file added or updated to the second server from the first server based on the validation parameters, and to verify the existence of said identified data file on the second server based on the validation parameters.

11. The system of claim 10, wherein the event in the first location is a failure of said first server.

12. The system of claim 10, wherein said second metadata includes one or more attributes of data files in said second file system, said attributes including one or more of a filename, a file type, a file create date, a file created by, a file size, a last update date, a last update time, a last updated by, a last access date, a last access time, a last accessed by, and a format.

13. The system of claim 10, wherein the Validator module is configured to modify the second metadata to remove references to said identified data file responsive to the said identified data file not existing on the second server.

14. The system of claim 10, wherein said validation parameters include one or more of a start date for validating the second data, a start time for validating the second data, an end date for validating the second data, an end time for validating the second data, wherein the data file is identified when the data file was added or updated to the second server from the first server between the start time on the start date and the end time on the end date.

15. The system of claim 10, wherein the Validator module is further configured to modify the second metadata when the second file system contains the second metadata and does not contain the second data so that the second metadata is synchronized with the second data.

16. The system of claim 10, wherein the Validator module is further configured to delete any portion of the second data when the second file system contains the second data and does not contain the second metadata.

17. The system of claim 10, wherein the Validator module is further configured to delete any portion of the second metadata when the second file system contains the second metadata and does not contain the second data.

18. The system of claim 10, wherein the Validator module is further configured to initialize in response to detecting the event.

* * * * *